United States Patent
Kubota

(10) Patent No.: US 7,084,964 B2
(45) Date of Patent: Aug. 1, 2006

(54) OPTICAL POWER MEASURING APPARATUS

(75) Inventor: Hiroshi Kubota, Hamamatsu (JP)

(73) Assignee: Yokogawa Electric Corporation, Tokyo (JP)

( * ) Notice: Subject to any disclaimer, the term of this patent is extended or adjusted under 35 U.S.C. 154(b) by 483 days.

(21) Appl. No.: 10/671,311

(22) Filed: Sep. 25, 2003

(65) Prior Publication Data

US 2004/0061849 A1    Apr. 1, 2004

(30) Foreign Application Priority Data

Sep. 30, 2002 (JP) .......................... P. 2002-287939

(51) Int. Cl.
   *G01J 1/42* (2006.01)

(52) U.S. Cl. ...................................... 356/218; 356/222

(58) Field of Classification Search ......... 356/213–235
   See application file for complete search history.

(56) References Cited

U.S. PATENT DOCUMENTS 4,225,245 A * 9/1980 Roiret et al. ................. 356/437

FOREIGN PATENT DOCUMENTS

JP        402025718 A  *  1/1990

* cited by examiner

*Primary Examiner*—Hoa Q. Pham
(74) *Attorney, Agent, or Firm*—Sughrue Mion, PLLC

(57) ABSTRACT

An optical power measuring apparatus for successively measuring optical power in a time series and displaying a time axis change of the measurement values as a measurement screen fixedly displays the latest measurement value of optical power on the measurement screen, and improves a working factor of an optical axis adjustment.

12 Claims, 6 Drawing Sheets

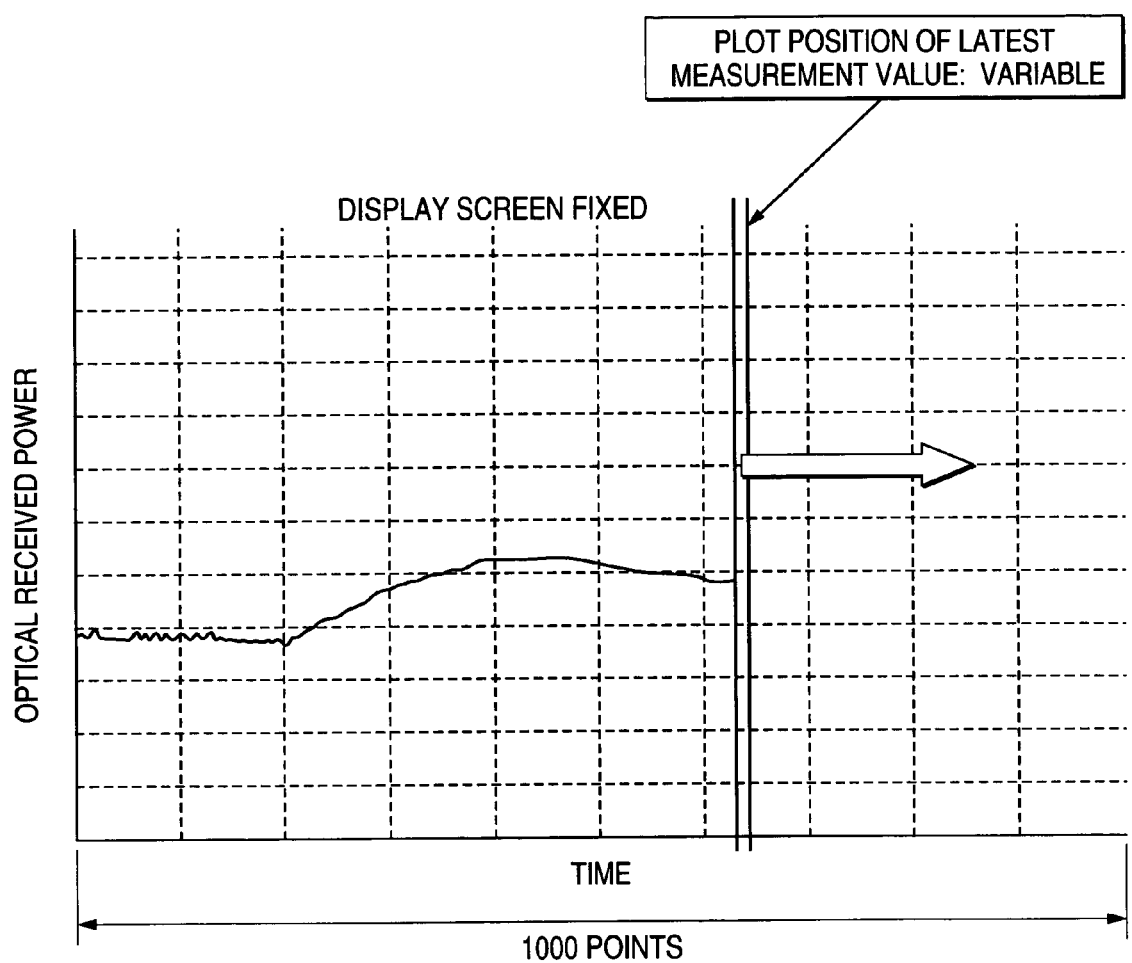

OPTICAL POWER MEASURING APPARATUS

BACKGROUND OF THE INVENTION

1. Field of the Invention

This invention relates to an optical power measuring apparatus.

2. Description of the Related Art

FIG. 6 schematically shows an example of a measurement screen of an optical power measuring apparatus according to the prior art. In this measurement screen, the latest measurement value successively moves from a left end to a right end of the screen with the lapse of time and is displayed. When the latest measurement value reaches the right end, the latest measurement value is again displayed at the left end and moves towards the right end. Such a measurement screen is used for adjusting an optical axis of each optical device constituting an optical system, for example. To adjust the optical axis of the optical device, an operator minutely moves the position of the optical device while measuring transmitted light of the optical device by use of an optical power measuring apparatus and decides the position of the optical device so that the intensity of transmitted light becomes maximal. During this optical axis adjustment, the operator adjusts the position of the optical device while tracing with eye the latest measurement value successively moving as described above. Incidentally, the applicant of the invention does not know any reference describing such an optical power measuring apparatus.

SUMMARY OF THE INVENTION

The adjustment work of the optical axis using the measurement screen has an extremely low working factor because the latest measurement value moves on the screen. Moreover, when the latest measurement value reaches the right end, it then moves instantaneously to the left end and the operator cannot easily trace with eye the latest measurement value. When the latest measurement value reaches the right end and returns to the left end, the oldest measurement value remains displayed on the right side of the latest measurement value, that is, in the moving direction of the latest measurement value, and gives an offensive feeling to the operator.

In view of the problem described above, the invention aims at improving the working factor of the optical axis adjustment.

To accomplish this object, the invention employs, as first means, a construction of an optical power measuring apparatus for successively measuring an optical power in a time series and displaying a time axis change of measurement values as a measurement screen, wherein the latest measurement value of the optical power is fixedly displayed on the measurement screen.

In the first means described above, the invention employs as second means a construction wherein the latest measurement value is fixedly displayed at the right end of the measurement screen, and measurement values continuing in time series the latest measurement value are successively displayed on the left side of the latest measurement value.

In the first or second means described above, the invention employs as third means a construction wherein a maximum value display auxiliary line representing the maximum measurement value is additionally displayed.

In any of the first to third means described above, the invention employs as fourth means a construction wherein a minimum value display auxiliary line representing the minimum measurement value is additionally displayed.

In any of the first to fourth means described above, the invention employs as fifth means a construction wherein a plotting updating speed of the measurement screen is variably set on the basis of speed designation information inputted from outside.

In any of the first to fifth means described above, the invention employs as sixth means a construction which further includes a memory (4) for storing a greater number of measurement values than the measurement values actually displayed on the measurement screen.

BRIEF DESCRIPTION OF THE INVENTION

FIG. 6 is a schematic view showing an example of a measurement screen of an optical power measuring apparatus according to the prior art.

DESCRIPTION OF THE PREFERRED EMBODIMENT

An optical power measuring apparatus according to an embodiment of the invention will be hereinafter explained with reference to the accompanying drawings.

Figure 1:
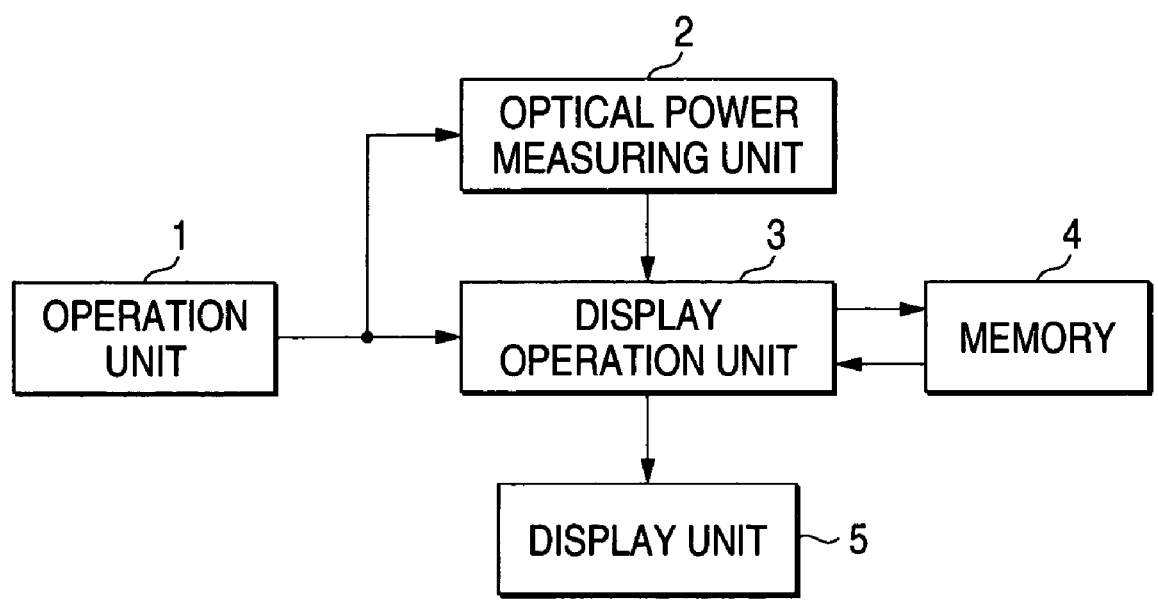
FIG. 1 is a block diagram showing a functional construction of an optical power measuring apparatus according to an embodiment of the invention.

FIG. 1 is a block diagram showing a functional construction of an optical power measuring apparatus according to the invention. In the drawing, reference numeral 1 denotes an operation unit. Reference numeral 2 denotes an optical power measurement unit. Reference numeral 3 denotes a display operation unit. Reference numeral 4 denotes a memory. Reference numeral 5 denotes a display unit. The operation unit 1 is for inputting various setting information necessary for intensity measurement to the optical power measurement portion 2 and to the display operation unit 3. Various setting information inputted from the operation unit 1 include speed designation information for designating a plotting updating speed of a measurement screen, for example. The optical power measurement unit 2 detects in a time series the intensity (optical power) of measurement light successively inputted from a measurement object and outputs the detection result as a measurement value to the display operation unit 3.

The display operation unit 3 executes an operation on the basis of a predetermined program, causes the memory 4 to successively store the measurement values and successively reads out the measurement values from the memory 4 so that a measurement screen can be generated and outputted to the display unit 5. Incidentally, the detail of the display operation unit 3 will be described later.

The memory 4 has a screen display buffer for storing the measurement values. The memory 4 is caused to successively store the measurement values under control of the display operation unit 3, to read out the measurement value from the memory 4 and to output it to the display operation unit 3. This memory 4 stores the measurement value 10001 in total of arrangement elements as D(0) to D(10000), for example, as will be described later in further detail. Among these arrangement elements D(0) to D(10000), the arrangement elements D(0) to D(1000) are set inside the memory 4 and are also stored in the screen display buffer (memory area) corresponding to each position in the transverse direction of the measurement screen. In other words, the memory 4 has a memory capacity for storing a greater number of measurement values than the measurement values displayed in practice on the measurement screen. The display unit 5 is a liquid crystal display, for example, and displays the measurement screen inputted from the display operation unit 3.

Figure 2:
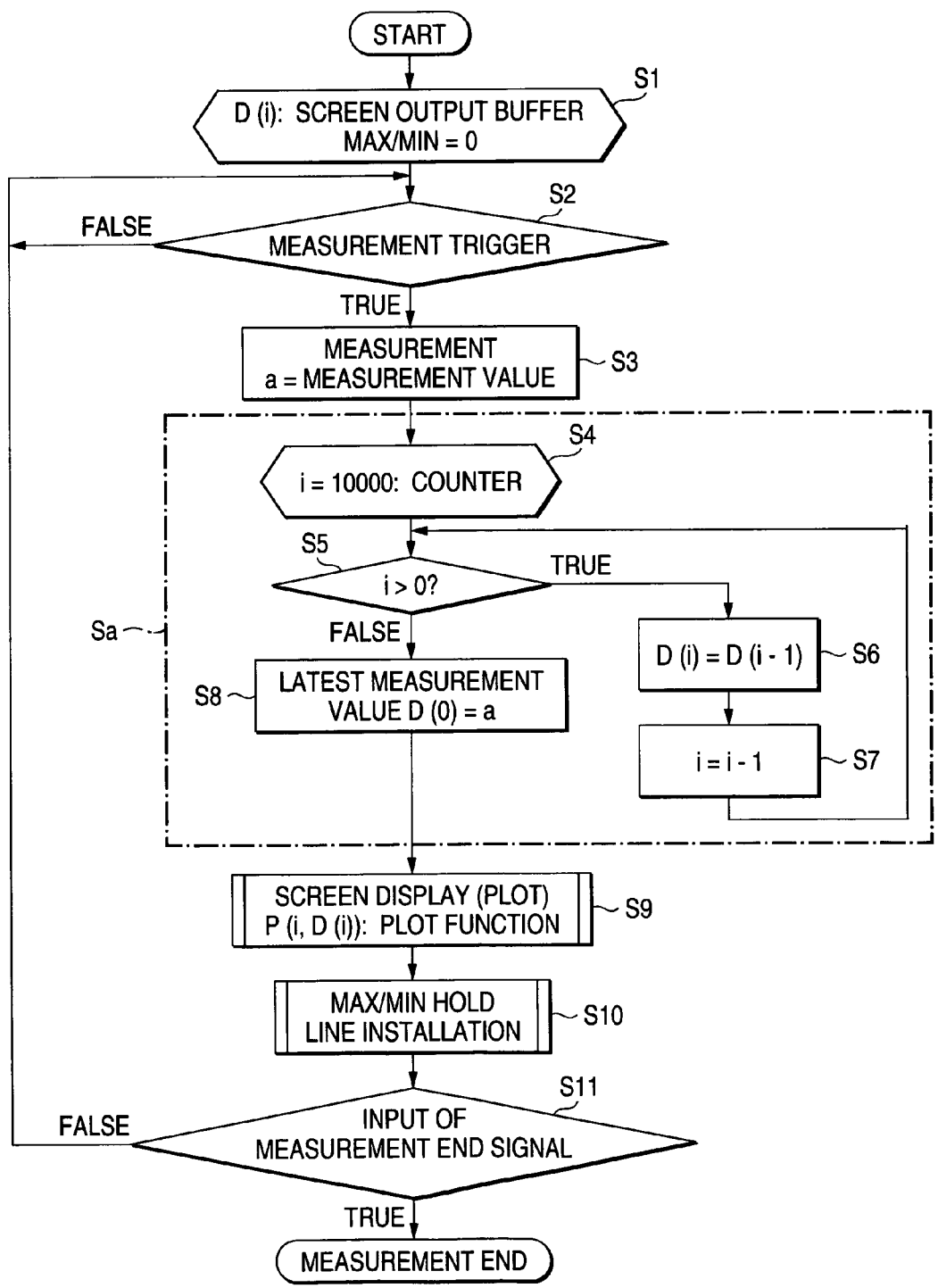
FIG. 2 is a flowchart showing a main processing of the optical power measuring apparatus according to the embodiment of the invention.

Next, the detailed operation of the optical power measuring apparatus will be explained with reference to the flowchart shown in FIG. 2. Incidentally, this flowchart represents the main processing of the display operation unit 3 described above.

First, when a measurement start instruction is inputted from the operation unit 1, the optical power measurement unit 2 successively detects in a time series optical power of measurement light in synchronism with a measurement trigger generated in a predetermined time interval, and outputs the measurement trigger to the display operation unit 3. In contrast, the display operation unit 3 processes in the following way each detection result (measurement value) of optical power serially acquired from the optical power measurement unit 2, generates a measurement screen and causes the display unit 5 to display the measurement screen.

In other words, the display operation unit 3 sets an arrangement D(i) of the measurement values stored in the screen display buffer and initially sets a variable Max representing the maximum value of the measurement value and a variable Min representing the minimum value of the measurement value to 0 (Step S1). When the setting processing is completed in this way, the display operation unit 3 enters the standby state where the measurement trigger that represents completion of acquisition of one measurement value of optical power is inputted from the optical power measurement unit 2 (Step S2).

Figure 3:
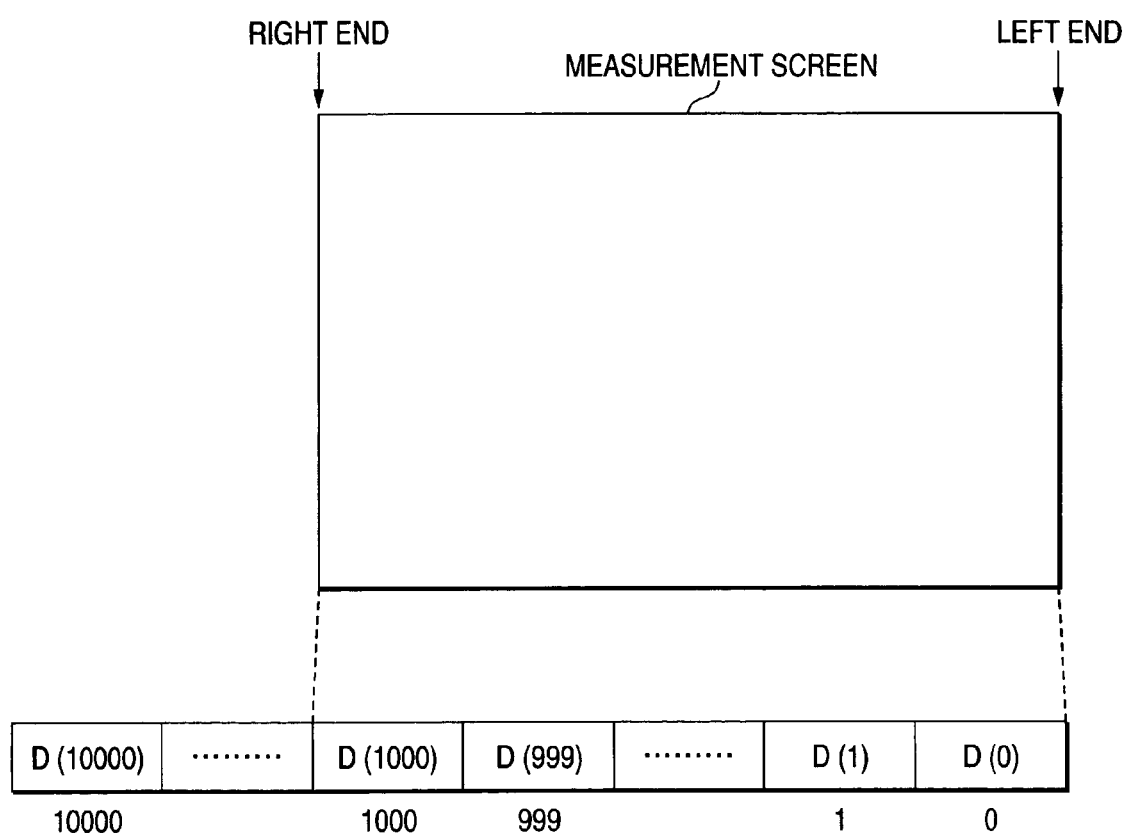
FIG. 3 is an arrangement diagram of a screen display buffer of the optical power measuring apparatus according to the embodiment of the invention.

Here, the arrangement variable i is an integer within the range of from 0 to 10,000. Therefore, the arrangement D(i) described above has 10,001 in total of the arrangement elements of from D(0) to D(10000). Each of these arrangement elements D(0) to D(10000) corresponds to a position of the measurement screen, and the arrangement element having a greater arrangement variable i is so arranged as to successively correspond to a right position from the left end of the measurement screen. The arrangement elements D(0) to D(10000) having an arrangement variable of up to "1,000" among these arrangement elements D(0) to D(10000) are arranged in such a fashion that the arrangement element D(1000) corresponds to the left end of the measurement screen and the arrangement element D(0) corresponds to the right end of the measurement screen as shown in FIG. 3.

When the measurement trigger is inputted from the optical power measurement unit 2 (that is, when the judgment of Step S2 proves "True"), the display operation unit 3 allocates the measurement value to the control variable a acquired from the optical power measurement unit 2 (Step S3) and sets the value of a counter giving the arrangement variable i to "10,000" that is the maximum value of the arrangement variable i (Step S4). The display operation unit 3 subtracts the arrangement variable i on the basis of a series of processing of Steps S5 to S7 and updates the arrangement elements designated by this arrangement variable i to D(10000)→D(0) and finally allocates the measurement value allocated to the control variable a to the arrangement element D(0) corresponding to the right end of the measurement screen (Step S8).

In other words, among the measurement values successively taken into the display operation unit 3 from the optical power measurement unit 2 as a result of the series of processing of Steps S5 to S8, the latest measurement value is allocated to the arrangement element D(0) and the measurement values are thereafter allocated in time series from a new measurement value to the arrangement element D(1)→ arrangement element D(2)→arrangement element D(3)→ . . . → arrangement element D(1000). The series of processing of Steps S5 to S8 is a processing that successively shifts the display position of the measurement value on the measurement screen from the right end to the left, that is, a left shift processing (Step Sa).

Figure 4A:
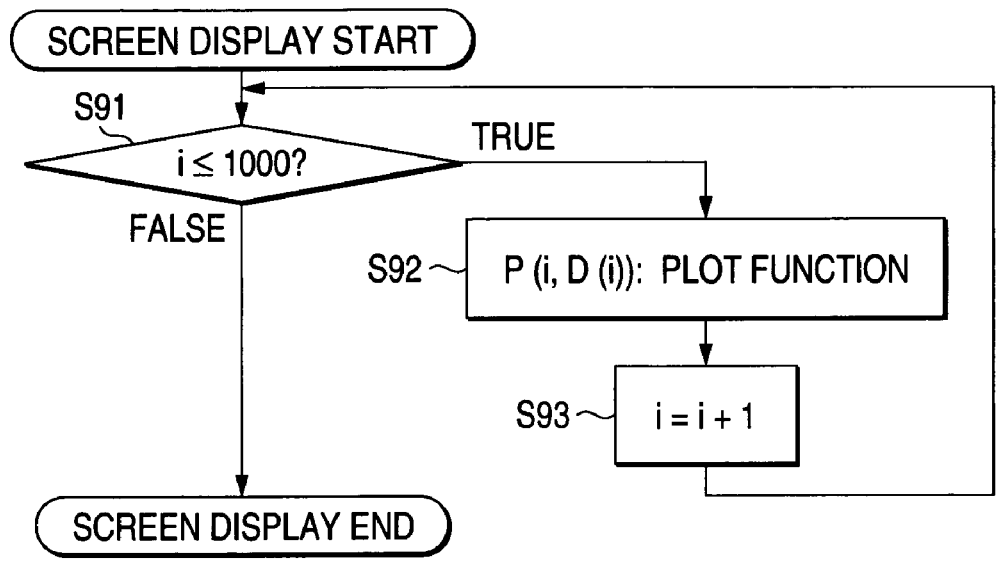
FIG. 4 is a flowchart showing in detail a screen display processing and a hold line installation processing of the optical power measuring apparatus according to the embodiment of the invention.

When the latest measurement value is allocated to the arrangement element D(0) in this way, the display operation unit 3 displays the measurement value stored in the screen display buffer as the arrangement element D(0) on the measurement screen displayed on the display unit 5 by use of the plotting function P{i, D(i)} (Step S9). In other words, whether or not the arrangement variable i shown in FIG. 4A is below "10000", that is, whether or not it corresponds to the arrangement element D(10000) to the arrangement element D(1001) that are not displayed on the measurement screen, is judged in the screen display processing in this step S9 (Step S91).

When this judgment proves "True", the plotting position on the measurement screen is calculated and plotting is made on the basis of the plotting function P{i, D(i)} for the measurement values stored in the arrangement element D(1000) to the arrangement element D(0) (Step S92). Finally, the arrangement variable i is incremented (Step S93). Incidentally, the measurement values stored in the arrangement elements D(10000) to D(1001) are not generally displayed on the measurement screen but can be displayed on the measurement screen in accordance with the display instruction inputted from the operation unit 1.

Figure 4B:
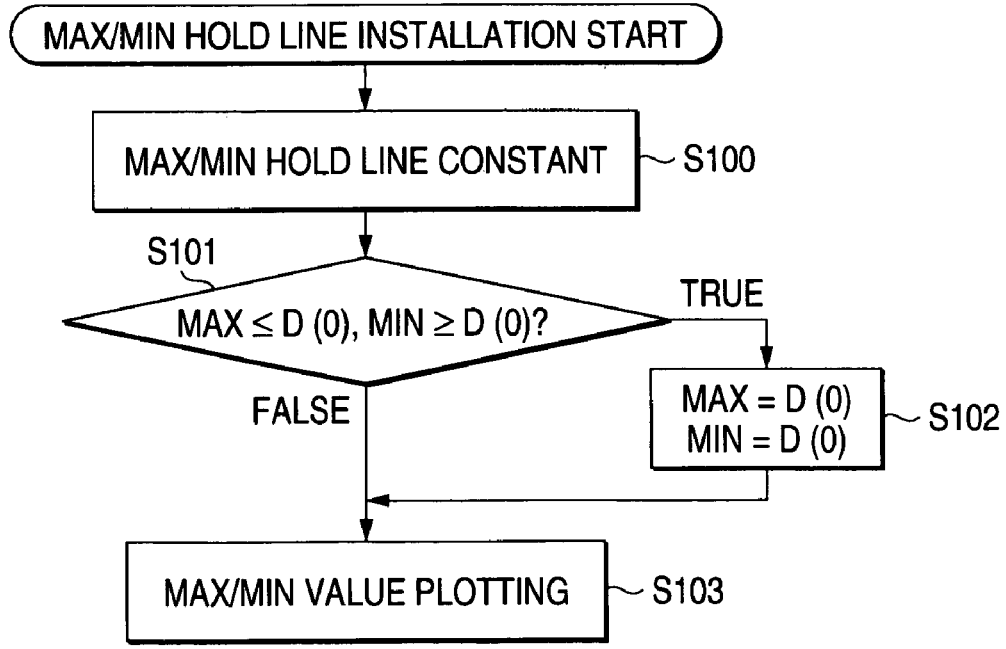

When the screen display processing described above is completed, the display operation unit 3 executes Max/Min Hold Line Installation processing (Step S10). In other words, the display operation unit 3 sets a Hold Line constant for each of the variable Max representing the maximum value of the measurement value and the variable Min representing the minimum value of the measurement value as shown in FIG. 4B (Step S100) and allocates the latest measurement value corresponding to the arrangement element D(0) to the variable Max and to the variable Min (Step S102) when the variable Max is smaller than the latest measurement value corresponding to the arrangement element D(0) and the variable Min is greater than the latest measurement value (Step S101).

In other words, as a result of the series of processing of Steps S100 to S102, the maximum value of the measurement values successively taken into the display operation unit 3 from the optical power measurement unit 2 is allocated to the variable Max and the minimum value is allocated to the variable Min. The display operation unit 3 additionally plots the value of the variable Max (maximum value) as the Max Hold Line (maximum value display auxiliary line) on the measurement screen and the value of the variable Min as the Min Hold line (minimum value display auxiliary line) on the measurement screen (Step S103).

Figure 5:
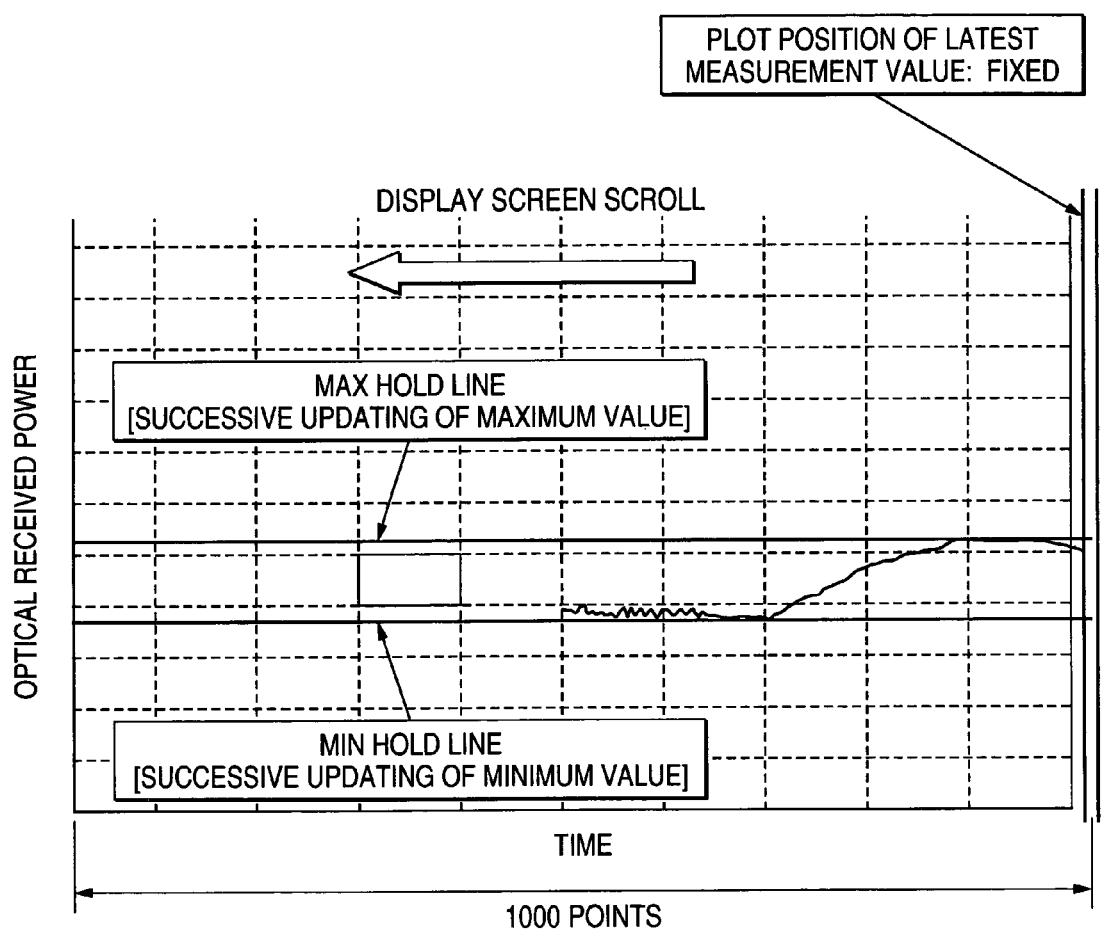
FIG. 5 is a schematic view showing a measurement screen of the optical power measuring apparatus according to the embodiment of the invention.

When the Max/Min Hold Line Installation processing (Step S10) is thus completed, the display operation unit 3 repeats the series of processing of Steps S1 to S11 until the measurement end signal instructing the end of measurement is inputted from the operation unit 1 (Step S11). As a result, the display operation unit 3 successively takes the measurement values from the optical power measurement unit 2, displays always the latest measurement value at the right end and also displays in the time series the old measurement values on the left side of the latest measurement value as represented by an example of the measurement screen in FIG. 5. Max Hold Line and Min Hold Line based on the Max/Min Hold Line Installation processing (Step S10) are displayed in the form added to the measurement value.

In comparison with the prior art apparatus in which the latest measurement value serially moves, the optical power measuring apparatus according to the invention makes it easier to confirm the measurement value with eye. Therefore, when the optical power measuring apparatus of the invention is used for adjusting an optical axis for assembling an optical system, for example, the working factor of the optical axis adjustment work can be drastically improved.

The measurement values successively taken from the optical power measurement unit 2 into the display operation unit 3 are successively written into the memory 4 as the arrangement elements D(10000) to D(0). However, the left shift processing described above (Step Sa) serially erases the measurement values from the old measurement values in the time series and serially writes the new measurement values into the memory 4. Though the memory 4 has a finite memory area, measurement of the optical power can be continued without being limited by this memory area (that is, limitation of the measurement time). When the optical power measuring apparatus of the invention is utilized for the optical axis adjustment, the optical axis adjustment can be conducted without being limited by the adjustment time.

As explained above, the inventions provides the optical power measuring apparatus that successively measures the optical power in the time series and display the time axis change of the measurement values as the measurement screen, and fixedly displays the latest measurement value of the optical power on the measurement screen. Therefore, the optical power measuring apparatus of the invention can improve the working factor of the optical axis adjustment in comparison with the prior art apparatus in which the latest measurement value successively changes.

What is claimed is:

1. An optical power measuring apparatus for successively measuring an optical power in a time series and displaying a time axis change of measurement values as a measurement screen, wherein the latest measurement value of the optical power is fixedly displayed on the measurement screen.

2. An optical power measuring apparatus according to claim 1, wherein the latest measurement value is fixedly displayed at the right end of the measurement screen, and measurement values continuing in time series the latest measurement value are successively displayed on the left side of the latest measurement value.

3. An optical power measuring apparatus according to claim 1 or 2, wherein a maximum value display auxiliary line representing the maximum measurement value is additionally displayed.

4. An optical power measuring apparatus according to claim 1 or 2, wherein a minimum value display auxiliary line representing the minimum measurement value is additionally displayed.

5. An optical power measuring apparatus according to claim 1 or 2, wherein a plotting updating speed of the measurement screen is variably set on the basis of speed designation information inputted from outside.

6. An optical power measuring apparatus according to claim 1 or 2, which further includes a memory (4) for storing a greater number of measurement values than the measurement values actually displayed on the measurement screen.

7. An optical power measuring apparatus according to claim 3, wherein a minimum value display auxiliary line representing the minimum measurement value is additionally displayed.

8. An optical power measuring apparatus according to claim 7, wherein a plotting updating speed of the measurement screen is variably set on the basis of speed designation information inputted from outside.

9. An optical power measuring apparatus according to claim 8, which further includes a memory (4) for storing a greater number of measurement values than the measurement values actually displayed on the measurement screen.

10. An optical power measuring apparatus according to claim 3, wherein a plotting updating speed of the measurement screen is variably set on the basis of speed designation information inputted from outside.

11. An optical power measuring apparatus according to claim 10, which further includes a memory (4) for storing a greater number of measurement values than the measurement values actually displayed on the measurement screen.

12. An optical power measuring apparatus according to claim 3, which further includes a memory (4) for storing a greater number of measurement values than the measurement values actually displayed on the measurement screen.

* * * * *